(12) United States Patent
De Assis Ressel Pereira et al.

(10) Patent No.: US 12,146,390 B2
(45) Date of Patent: Nov. 19, 2024

(54) SYSTEM FOR EVALUATION OF THE PRECIPITATION, ADHESION AND INORGANIC SCALE

(71) Applicants: Petróleo Brasileiro S.A.—Petrobras, Rio de Janeiro (BR); Universidade Federal Do Espírito Santo—UFES, Vitória (BR)

(72) Inventors: Fabio De Assis Ressel Pereira, Vila Velha (BR); Rafael De Paula Cosmo, Vitória (BR); Andre Leibsohn Martins, Rio de Janeiro (BR); Helga Elisabeth Pinheiro Schluter, Niterói (BR); Bruno Barbosa Castro, Rio de Janeiro (BR)

(73) Assignees: Petróleo Brasileiro S.A.—Petrobras, Rio de Janeiro (BR); Universidade Federal Do Espírito Santo—UFES, Vitoria (BR)

( * ) Notice: Subject to any disclaimer, the term of this patent is extended or adjusted under 35 U.S.C. 154(b) by 191 days.

(21) Appl. No.: 17/858,312

(22) Filed: Jul. 6, 2022

(65) Prior Publication Data
US 2023/0009732 A1 Jan. 12, 2023

(30) Foreign Application Priority Data
Jul. 7, 2021 (BR) .................. 10 2021 013401 1

(51) Int. Cl.
*G01N 17/00* (2006.01)
*E21B 37/06* (2006.01)

(52) U.S. Cl.
CPC ........... *E21B 37/06* (2013.01); *G01N 17/002* (2013.01); *G01N 17/008* (2013.01)

(58) Field of Classification Search
CPC ...................................................... E21B 37/06
USPC ...................................................... 73/865.6
See application file for complete search history.

(56) References Cited

U.S. PATENT DOCUMENTS 10,138,715 B2    11/2018 Adebayo et al.

FOREIGN PATENT DOCUMENTS

| CN | 212568343 U | * | 2/2021 | |
|---|---|---|---|---|
| CN | 114609001 A | * | 6/2022 | |
| WO | WO-2020028198 A1 | * | 2/2020 | ......... B01D 11/0207 |

OTHER PUBLICATIONS

Zhao et al. Machine translation of CN-114609001-A. Published Jun. 2022. (Year: 2022).*

(Continued)

*Primary Examiner* — Walter L Lindsay, Jr.
*Assistant Examiner* — Philip T Fadul
(74) *Attorney, Agent, or Firm* — Mintz, Levin, Cohn, Ferris, Glovsky and Popeo, P.C.

(57) ABSTRACT

The present invention addresses to a system that aims at reproducing situations close to those found in oil wells, in relation to the thermodynamic conditions (pressure and temperature), and the fluids present (by means of the chemical species involved), aiming at representing in a more realistic way the production scenarios to be faced. The main scope is to represent on a laboratory scale the phenomenon of depressurization with the release of carbon dioxide inducing the precipitation of calcite (calcium carbonate), the growth and agglomeration of inorganic crystals, and the phenomena of adhesion and scale on common metallic surfaces of elements of completion of oil wells.

11 Claims, 9 Drawing Sheets

(56) References Cited

OTHER PUBLICATIONS

Zhang et al. Machine translation of CN-212568343-U. Published Feb. 2021. Accessed Mar. 2024. (Year: 2021).*
Shi et al., "Solubility of Barite Up to 250° C. and 1500 Bar in Up to 6 M NaCl Solution", Industrial & Engineering Chemistry Research, 2012, 51(7):3119-3128.

* cited by examiner

SYSTEM FOR EVALUATION OF THE PRECIPITATION, ADHESION AND INORGANIC SCALE

Cross-Reference to Related Application

This application claims priority to Brazilian Application No. 10 2021 013401 1, filed on Jul. 7, 2021, and entitled "SYSTEM FOR EVALUATION OF THE PRECIPITATION, ADHESION AND INORGANIC SCALE," the disclosure of which is incorporated herein by reference in its entirety.

FIELD OF THE INVENTION

The present invention addresses to a system with application in the field of oil and gas production, aiming at reproducing on a laboratory scale the precipitation, adhesion and inorganic scale, especially of calcite, in thermodynamic conditions (pressure and temperature) close to those found in oil wells (100 bar (10 MPa) and 100° C.), in addition to incorporating the effects of the presence of carbon dioxide.

DESCRIPTION OF THE STATE OF THE ART

The phenomenon of calcite precipitation, adhesion and scaling, aimed at the oil and gas industry, is commonly addressed in the literature by means of studies of the reaction between $NaHCO_3$ and $CaCl_2$) solutions under pressure and temperature conditions close to the ambient one. The few works that seek to represent the effect of $CO_2$ in solution start from undersaturated conditions.

The presence of carbon dioxide at high pressures aims at representing the saturation condition (dissolved) found in carbonate reservoirs that, due to their depletion, release it in the form of gas favoring the alteration of the chemical balance, according to the equation below, with the consequent precipitation of calcium carbonate, according to the Le-Chatelier principle.

$$Ca^{2+}+2HCO_3^- \leftrightarrow CaCO_3+H_2O+CO_{2(aq)}$$

Another feature observed is that the study of the dynamic behavior of calcite crystals is developed by means of intrusive techniques; that is, the tests are performed and the taken samples are taken to different conditions of the experiment so that they can be analyzed in other equipment, such as those using the techniques of laser beam diffraction or dynamic light scattering. This completely changes the actual content formed in the reactions, affecting the amount, morphology, type and, especially, eliminating the effects of studies with aqueous carbon gas, because it is released from the solution in the form of gas.

A gap in the studies is the absence in the experimental approach of the phenomenon in elements of completion in oil well conditions, such as smart valves, standalone sand containment screens or with proppant.

The system of the invention was designed around a reactor or pressure cell that, in addition to the presence of inorganic chemical species, includes the possibility of injecting $CO_2$ and $N_2$ to pressurize the system to values close to those observed in conditions found in many oil wells (100 bar (10 MPa)).

This system also allows the variation of temperature and the evaluation of the effect of salinity in the process of precipitation, adhesion and scale. A constructive detail is that it has viewing windows that monitor the process in a non-intrusive way through photomicroscopy techniques. This strategy allows monitoring the dynamic behavior of crystals formed in the process (growth and agglomeration) under in situ conditions. Complementarily, it is coupled to two core-holders: one conventional and one screened.

Document U.S. Ser. No. 10/138,715B2 discloses a process for monitoring the formation of inorganic scale, using a plurality of temperature sensors and resistivity sensors, simultaneously logging the temperature and resistance of a carbonate formation. The document describes an experimental apparatus for measuring temperature, resistivity and storage of $CO_2$. Furthermore, it exemplifies the injection of pure $CO_2$ into brine-saturated carbonate samples to interpret the trends on the relation between $CO_2$/brine/rock and rock temperature and resistivity.

Despite the similarities, the present invention uses a greater versatility of temperature variation than the aforementioned work, in addition to performing pH measurements through a sensor. Furthermore, the system of the present invention has features that aim at monitoring the process in a non-intrusive way, which is also not disclosed in U.S. Ser. No. 10/138,715B2. It is worth to emphasize that the present invention focuses on the set of equipment that make up the experimental system for the evaluation of the growth and agglomeration of inorganic crystals and the phenomena of adhesion and scale in completion elements on a laboratory scale, while in U.S. Ser. No. 10/138,715B2, the focus is on the process monitoring fouling in completion equipment, as well as monitoring $CO_2$ sequestration in saline aquifers. It should also be emphasized that, after carrying out the chemical reactions for the formation of calcite crystals, the contents of the reactor can be discharged into the other subsystems of the invention, which will allow the evaluation of the effects of the flow of a fluid containing inorganic salts through elements of completion of oil wells and even in porous media.

The document by SHI, W.; KAN, A. T.; FAN, C.; TOMSON, M. B. (2012) "Solubility of Barite up to 250° C. and 1500 bar in up to 6 m NaCl Solution", Industrial & Engineering Chemistry Research, v. 51, p. 3119-3128, discloses a study of baryte solubility, under conditions of high temperature, pressure and ionic strength, providing a viable approach to evaluate the temperature and pressure dependence of virial coefficients on Pitzer equations of the ionic activity coefficients by means of the measurement of mineral solubility. In addition, the paper describes an apparatus for measuring scale formation at temperatures up to 250° C. and pressures up to 1700 bar (170 MPa). Although the document mentions an experimental apparatus for predicting fouling under conditions of high temperature and pressure, it does not anticipate the present invention, since it discloses an experimental system focused on the evaluation of the growth and agglomeration of inorganic crystals and the phenomena of adhesion and scaling in completion elements. In addition, the system of the present invention has different components in its design considerably departing from the aforementioned paper. It should also be emphasized that barite ($BaSO_4$) is an inorganic salt whose thermodynamics and kinetics are totally independent of $CO_2$, as is cooking salt (NaCl), which in no way comes close to the difficulties found in the study of calcite ($CaCO_3$).

The document by COSMO, R. P. (2013) "Modeling and thermodynamic simulation of calcite precipitation under well conditions", 217 pages, Dissertation (Master in Energy)—Federal University of Espírito Santo, Centro Universitário Norte do Espírito Santo, discloses a study to thermodynamically model the initial step of fouling under well conditions, which is the nucleation of the crystals from the solution, aiming at quantifying the content of calcite capable of precipitation from the solution. The work discloses a methodology capable of measuring the precipitated mass and distinguishing the origin of the factor causing calcite precipitation. Although the work reproduces the precipitation, adhesion and inorganic fouling under thermodynamic conditions similar to those found in oil wells according to the present invention, this is done by simulation and mathematical modeling, while the present invention creates an experimental system of equipment for laboratory scale reproduction, where the results will support the proposition of computational mathematical models. Accordingly, the work departs considerably from the technical solution presented in the present invention.

In this way, none of the documents presented in the State of the Art discloses a system for laboratory scale reproduction of precipitation, adhesion and inorganic scale under thermodynamic conditions close to those found in oil wells.

The present invention has the advantages of improving the understanding of the phenomena of precipitation, adhesion and scale and, mainly, evaluating the same in conditions closer to those found in oil production environments. The results will support the proposition of computational models so that they can bring an approximation of the problem in real-scale geometries and configurations of completion.

In this way, it will be possible to represent scenarios and production strategies that can best contribute to the elaboration of strategies not only for the intervention, but also for the mitigation of carbonate scales.

The reduction of interventions in wells during production means continuous production, greater volume of produced oil, and reduced maintenance costs. Considering that the wells most susceptible to problems with fouling due to depressurization are the pre-salt wells (high production flow rates), the economic benefit is quite significant.

BRIEF DESCRIPTION OF THE INVENTION

The present invention addresses to a system capable of reproducing on a laboratory scale the precipitation, adhesion and inorganic scale, especially calcite, in thermodynamic conditions both below and above the ambient one (2° C. and 1 bar (0.1 MPa), approaching those found in oil wells (100 bar (10 MPa) and 100° C.), in addition to incorporating the effects of the presence of carbon gas.

The system is designed around a reactor or pressure cell that, in addition to the presence of chemical species such as $NaHCO_3$, $CaCl_2$, $CaCO_3$, $NaCl$, includes the possibility of injecting $CO_2$ and $N_2$ to pressurize the system to values close to those observed under conditions found in many oil wells (100 bar (10 MPa)).

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

The experimental system of the present invention aims at reproducing situations close to those found in oil wells, not only at thermodynamic ones (pressure and temperature), but also in relation to fluids (by means of the chemical species involved), aiming at representing in a more realistic way the scenarios of completion to be faced. The main scope is to represent on a laboratory scale the phenomenon of depressurization with the release of carbon gas, inducing the precipitation of calcite (calcium carbonate), the growth and agglomeration of inorganic crystals, and the phenomena of adhesion and scale on metallic surfaces and in porous media.

Figure 1:
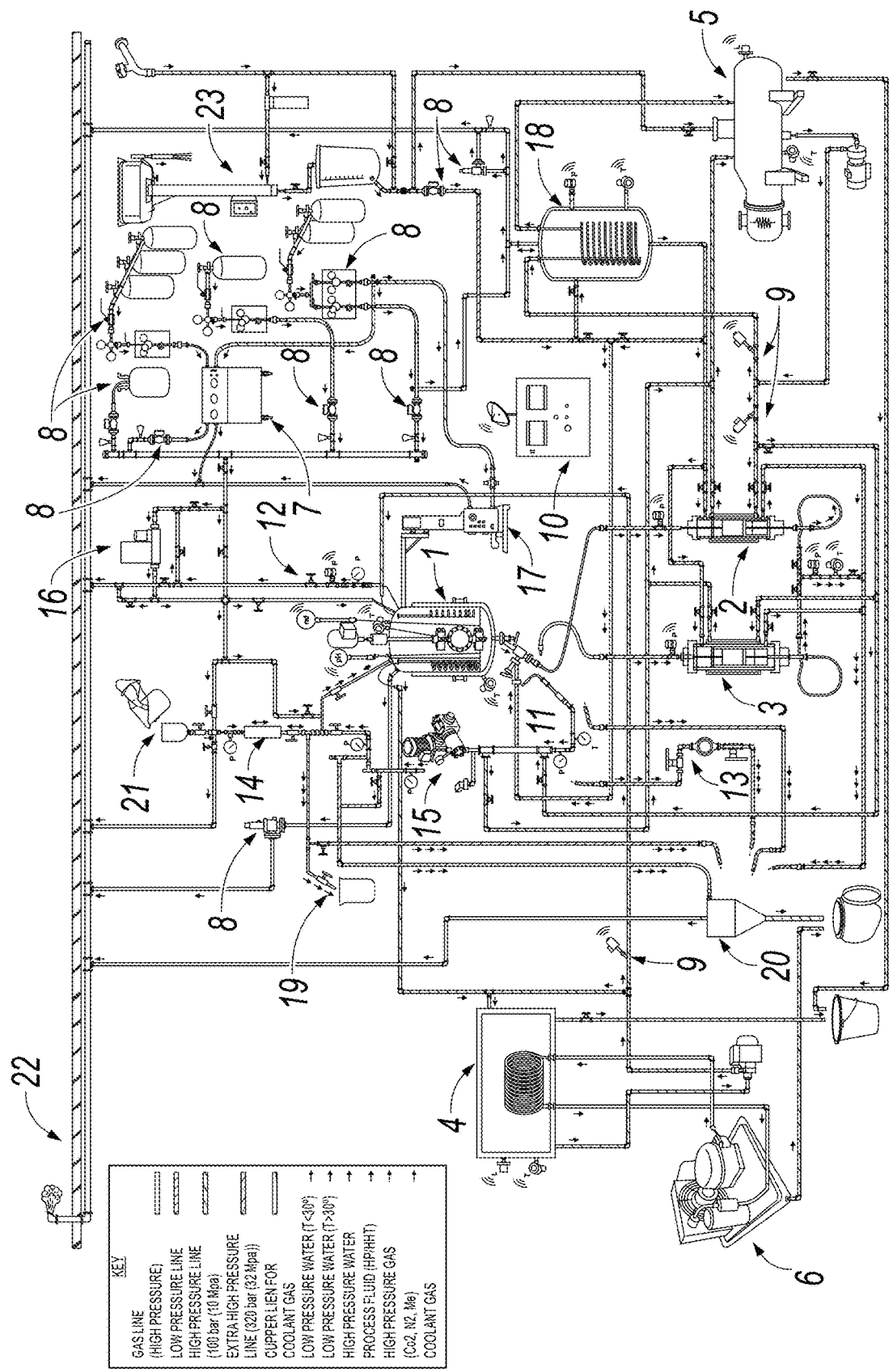
FIG. 1, which illustrates the descriptive flowchart of the system of the present invention.

The system for evaluating precipitation, adhesion and inorganic fouling, object of this invention, is illustrated in FIG. 1 comprising the following components: a reactor or pressurized cell (1) coupled to a core-holder (2) and a screened core-holder (3), an optical microscope (mobile accessory—not shown), a cold water buffer tank (4), a heater (reboiler) (5), a cooler (6), a booster (pressure increase) (7), safety valves (8) (check, PSV, PRV and PCV), control valves (9), a control panel (10), a solids collection filter (11), an impeller with coupon cage (50) (element internal to the reactor—shown in FIG. 4), gas vent relief valve and line (12), a dynamic display (13), pressurized pipette (14), a circulation pump (15), a gas flowmeter (16), a pneumatic lifter (17), a nitrogen pressurized hot water buffer tank (18), several sensors (not identified in the figure), a sample collector (19), a hydrocyclone (20), a funnel of addition of in-process reagents (21), a safety vent/gas exhauster (22), a distilled water system (23), a pH meter (represented in the figure coupled to the reactor—unidentified).

The reactor/pressurized cell (1) is capable of operating at pressures of up to 100 bar (10 MPa) and temperatures between 2° C. and 100° C., assisted by the subsystems of cooling (6) with cold water buffer tank (4), heating (5) and pressurization booster (7) with nitrogen pressurized hot water buffer tank (18), controlled by valves (9) and (12), sensors, transducers, pH meter, flowmeter (16), control panel (10), with the process safety guaranteed by safety valves (8) (check, PSV, PRV and PCV), by the gas vent line (22) and by the hydrocyclone (20), and with the auxiliary resources of distilled water operation (23) and lifting of the reactor cover by the pneumatic lifter (17).

Figure 5:
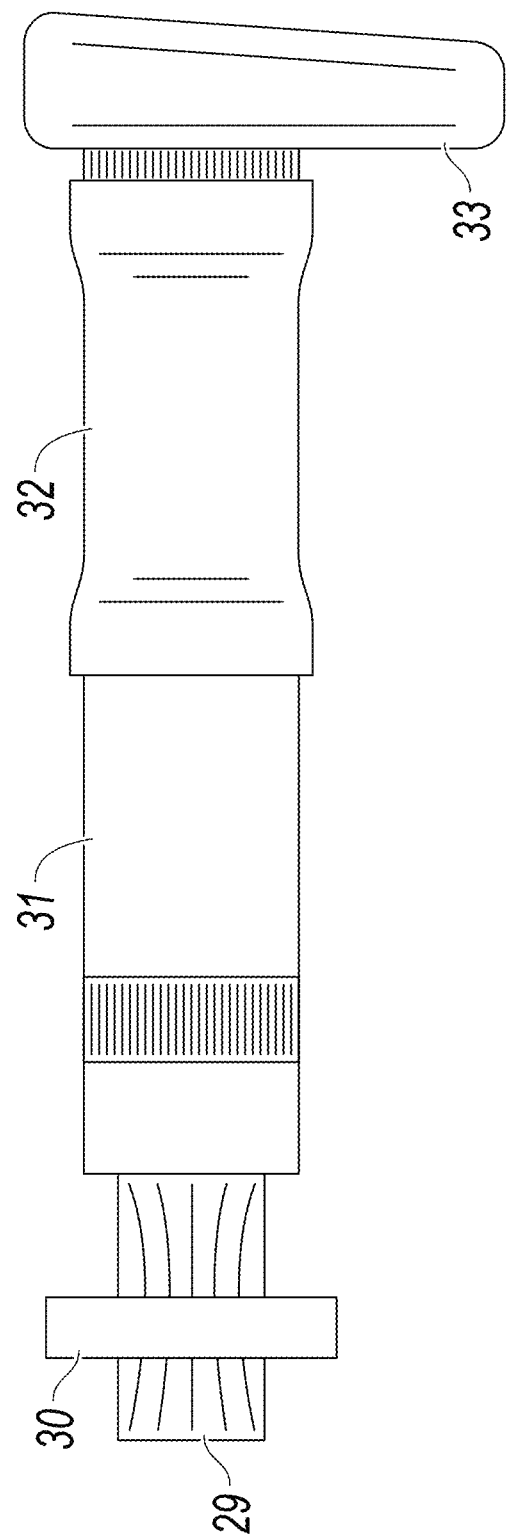
FIG. 5, which illustrates the coupling of lenses of the photomicroscopy system for the non-invasive investigation of phenomena associated with fouling, which will operate in front of the viewing windows of the reactor (1) or the dynamic display (13) of FIG. 1. There are represented: 10×objective lens (29), LED ring light (30), 4.7× ultrazoom (31), 3.3× zoom adapter (32), high resolution digital camera (33)

As can be seen in the flowchart of FIG. 1, the process begins with the addition of dissolved chemical species (such as $NaHCO_3$) in the reactor (1). Next, the pressurization of the system begins by injecting $CO_2$ and/or $N_2$. Through the previously pressurized pipette (14), the second solution ($CaCl_2$) is introduced into the system. Once the system is homogenized, the temperature is adjusted by the heating system (5). Once the desired thermodynamic conditions have been reached, pH measurements are carried out in order to monitor the process during depressurization, which occurs by opening the relief valve (12). Concomitantly, the behavior of the precipitation of calcite crystals is monitored through the microscope of FIG. 5 positioned in the viewing window.

Figure 2:
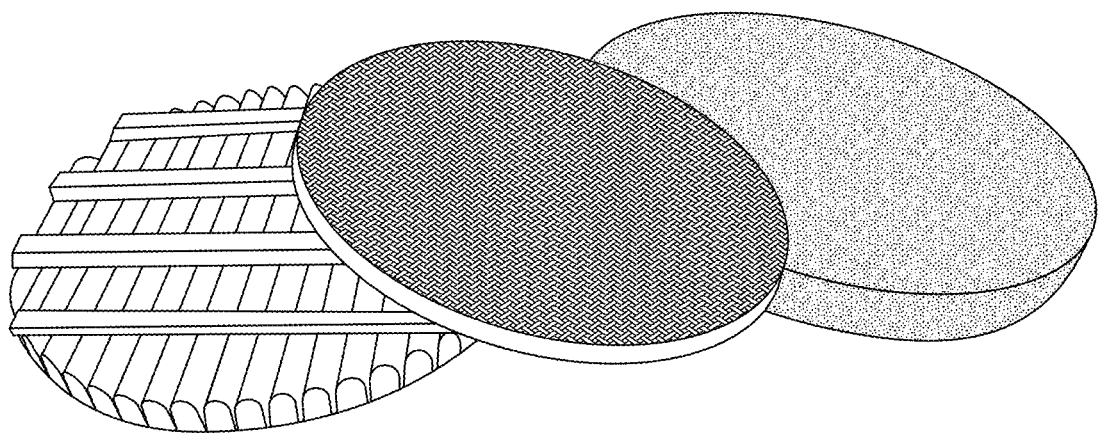
FIG. 2, which illustrates a set with premium screen coupon and sintered element that allows simulating the packing of proppant or coupling with the porous medium, which may be used inside the core-holder (3) of FIG. 1.
Figure 3:
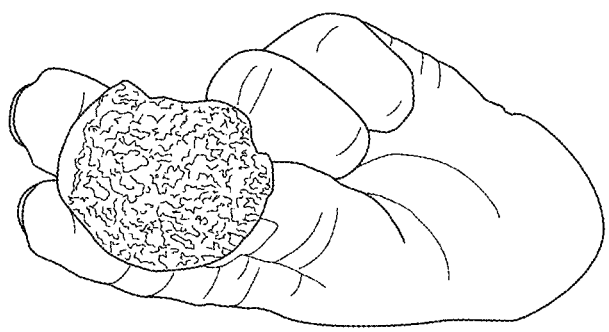
FIG. 3, which illustrates the porous specimens that may be used within the core-holders (2) and (3) of FIG. 1, which allow simulating the rocky environment.
Figure 3:
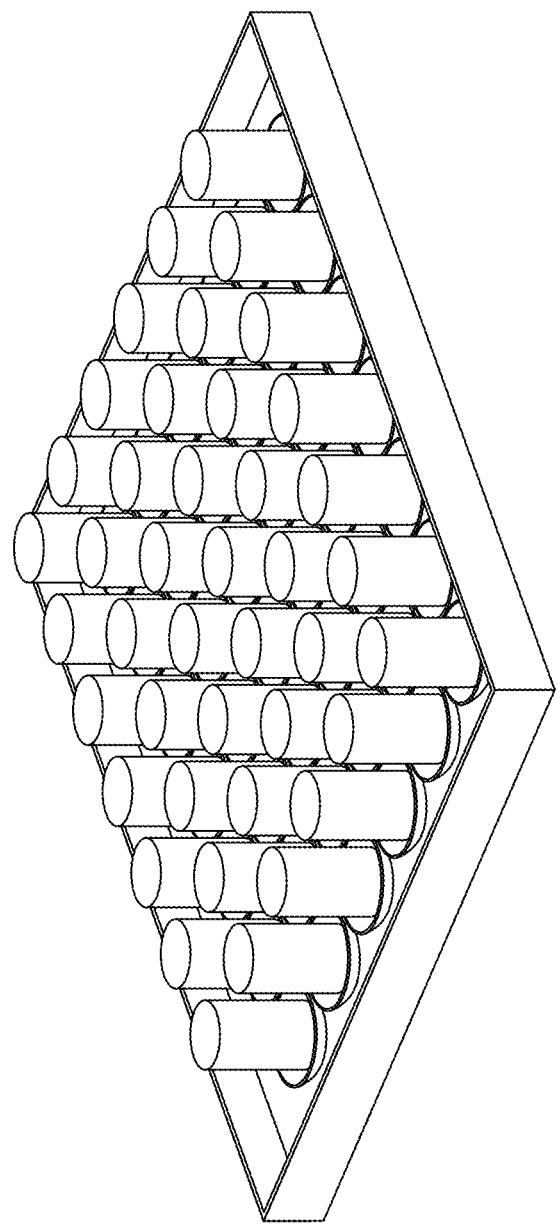

The reactor (1) has the option of connecting to auxiliary equipment (core-holders (2 and 3)), in which the depressurization will occur when passing through a completion element. This element can be a screen coupon (FIG. 2), representing a containment screen, or a porous medium (FIG. 3), representing a gravel-pack, or even a near well region. In this type of experiment, the effect of precipitation/fouling on the head loss associated with flow in the completion element can be evaluated. The system in question still allows the combination of the two systems, resulting in a coupon arrangement of screen and porous media simultaneously. It should be highlighted that the operation of these modules requires a pressure and temperature control system independent of the reactor system.

Another auxiliary equipment of the reactor (1) is the dynamic display (13). The reactor contents can be unloaded by passing through the display, where the particles can be visualized in flow, by displacing the microscope in FIG. 5 to the viewing windows of the dynamic display. In addition, the dynamic display (13) is provided with on-off valves, which allows confining a sample of the solution inside the same; that is, it allows to store an aliquot of the contents of the reactor (1) at the test pressure, being possible to detach the display from the set and transport the same for analysis in other equipment outside the laboratory.

The optical photomicroscopy system is capable of capturing particles with an equivalent diameter of 2.0 micrometers, at a pressure of 100 bar (10 MPa) directly inside the reactor (1) or the dynamic display (13), admitting the incorporation of features that capture particles with an equivalent diameter of 0.5 micrometer for lower pressures.

The solids collection filter (11) associated with the recirculation pump (15) is capable of removing solid particles from the solution, allowing supersaturation tests to be performed.

The hose system for selecting the type of auxiliary equipment to be used also allows the coupling of any other equipment that may be developed and that is intended to be tested under the presence of a pressurized, heated fluid containing precipitated material and in the presence of gases, like, for example, the prototype of an intelligent valve.

Figure 4:
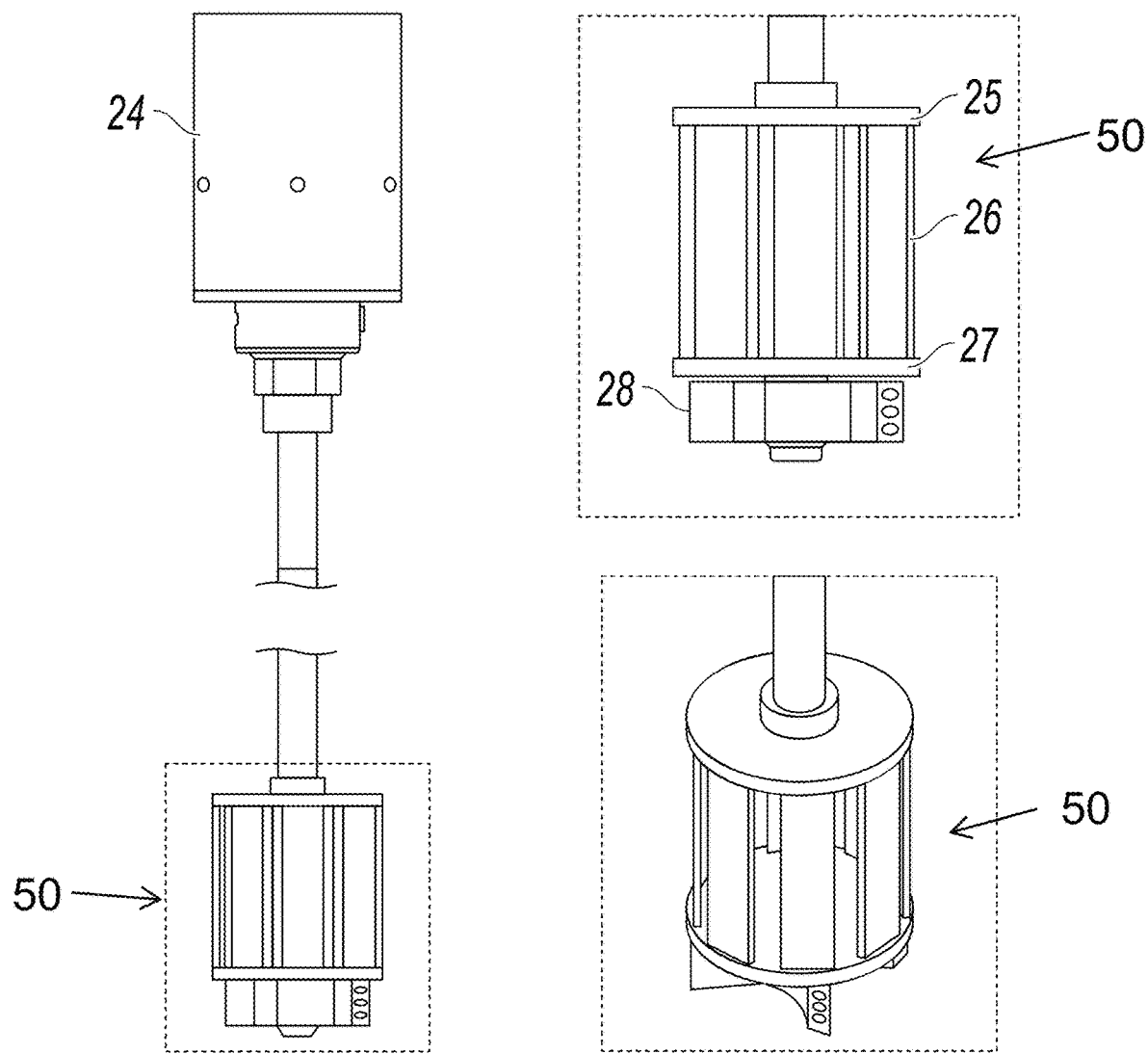
FIG. 4, which illustrates a schematic drawing of the metallic coupon cage (50) that will operate inside the pressurized reactor (1) of FIG. 1. There are represented in there: magnetic coupling of the motor (24), upper support (25), set of 8 coupons (26), lower support (27), impeller-type stirrer for bubbling $CO_2$ (28)

With the system operating with the metallic coupon cage (50), as shown in FIG. 4, it is possible to evaluate the deposition of $CaCO_3$ on different metallic surfaces, when subjected to the same depressurization process. In this way, it is possible to evaluate not only the effect of the material, but also the type of finishing (polished, burnished, ground), or even surfaces that have a polymeric coating layer. That is, the coupon cage (50) installed inside the reactor (1) is capable of evaluating dynamic fouling in different metallic or non-metallic materials, with different finishings and with different types of coating.

The coupling of the pressurized reactor (1) to two core-holders, that is, the core-holder (2) and the screened core-holder (3), will allow to evaluate the phenomenon of fouling in systems that represent the reservoir (porous medium), the well-reservoir coupling region, or constituent parts of completion elements (screens and gravel-pack).

With the conventional core-holder (2), it is possible to investigate the phenomenon of inorganic precipitation in porous specimens, which aim at representing not only a gravel-pack-type sand containment system, but also a near well condition. The second core-holder (3) is designed to support screen coupons that represent screen-type sand containment systems, such as wire-wrapped and premium, further allowing configurations with screen and porous medium, or even with porous medium, screen and porous medium, which makes it possible to evaluate the interface between porous medium and screen, and also between screen and proppant material of the gravel-pack.

The system has a multipurpose bias, allowing the study to be extended to related systems, such as inorganic scale around barium sulfate, and organic scale from methane hydrates or calcium and sodium naphthenates (organic soaps that are strongly dependent on the thermodynamics of $CO_2$, such as calcium carbonate).

Another aspect is the versatility of the system, which also allows temperature variation (up to 100° C.) and the insertion of other chemical species, aiming at evaluating the effect of salinity in the precipitation, adhesion and scaling processes.

It is worth to highlight that the system of the present invention has viewing windows that aim at monitoring the process in a non-intrusive way by means of photomicroscopy techniques. This strategy allows monitoring the dynamic behavior of crystals formed in the process (growth and agglomeration) under in situ conditions. Changing the thermodynamic conditions used with intrusive techniques has the potential to change the variables investigated.

Some experimental tests were carried out to evaluate the phenomena involved, in order to assist in the design and dimensioning of the system of the present invention.

Under laboratory conditions (ambient temperature and pressure), the technique of monitoring the dynamic behavior of calcite crystals was studied. The main objective was the validation of the microscopy technique against the established technique of granulometry by laser beam diffraction.

Figure 6:
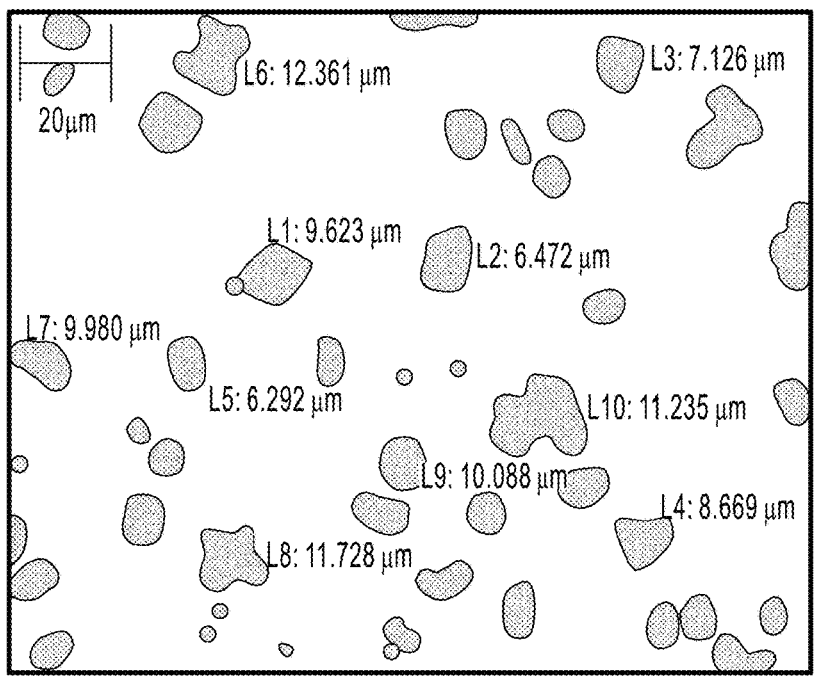
FIG. 6, which illustrates the formation of $CaCO_3$ crystals in a test performed in beaker, obtained with the photomicroscopy system of FIG. 5.
Figure 7:
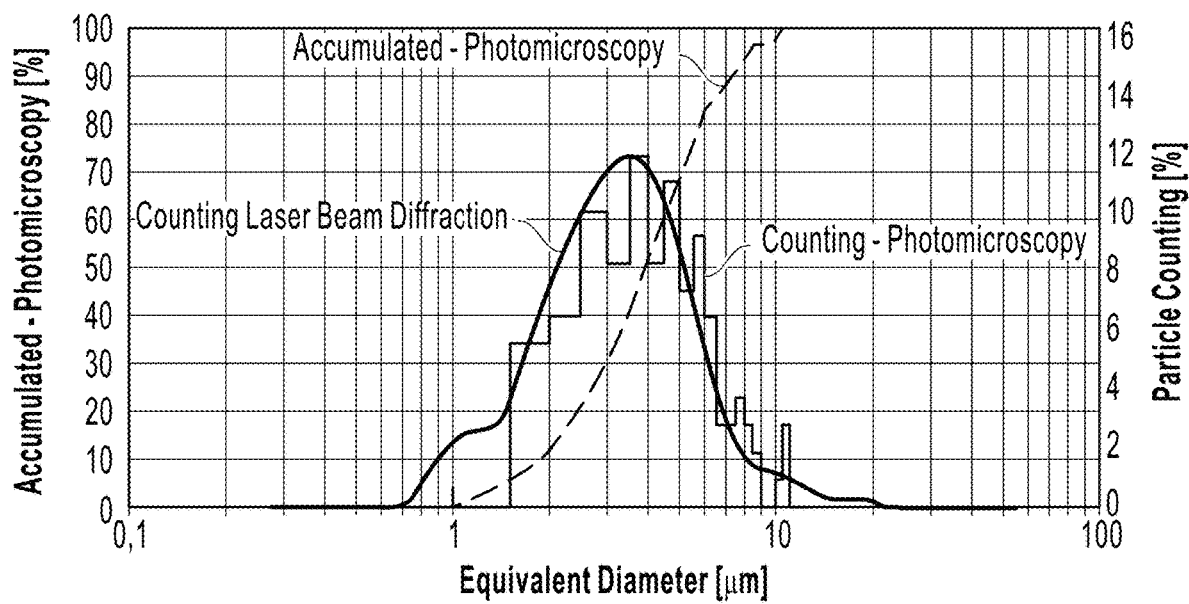
FIG. 7, which illustrates a graph of the validation of the photomicroscopy technique (which is non-invasive and can be applied in in situ conditions) against the technique of granulometry by laser beam diffraction (which is invasive and can only be applied in atmospheric conditions), for samples of the same $CaCO_3$ solution prepared in a beaker.

The result obtained by the analysis of microscope images (represented in FIG. 5), as shown in FIG. 6, in a non-intrusive condition, showed good agreement, as represented in FIG. 7.

Figure 8:
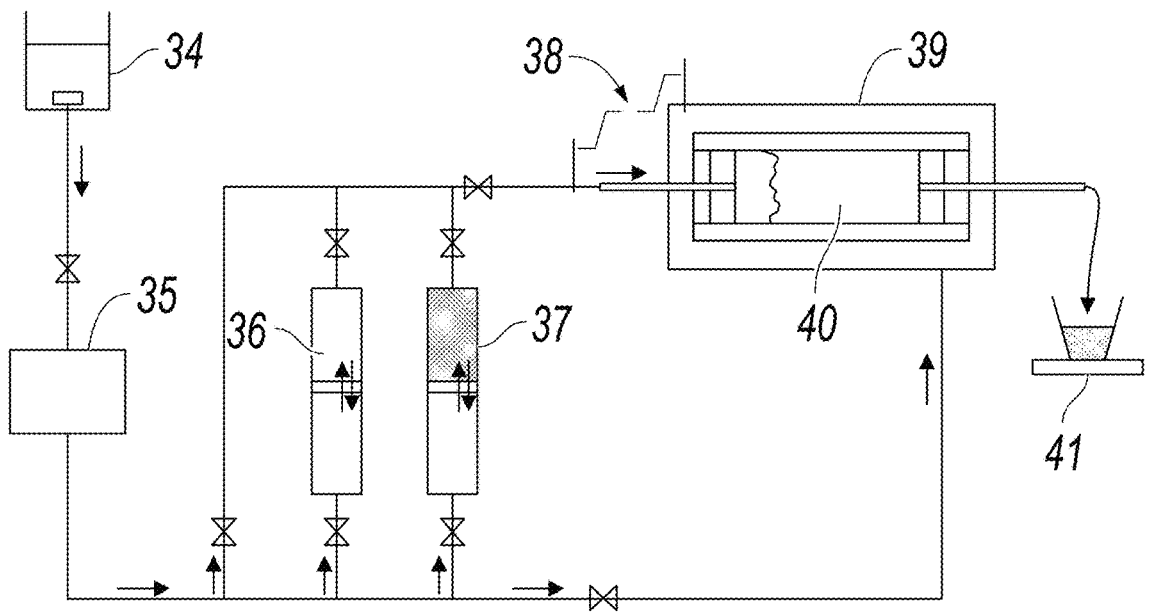
FIG. 8, which illustrates an experimental core-holder without the presence of gas and without the possibility of operating at temperatures higher than the ambient one. There are represented: water tank (34), pump (35), transfer cell—fluid 1 (cylinder-piston system) (36), transfer cell—fluid 2 (cylinder-piston system) (37), pressure transducers (38), core-holder (39), rock sample (porous medium) (40), balance (41)

Regarding precipitation in porous elements (gravel-pack), preliminary experimental tests were conducted on an apparatus to investigate the experimental conditions for precipitation in pressurized porous media (FIG. 8).

Figure 9:
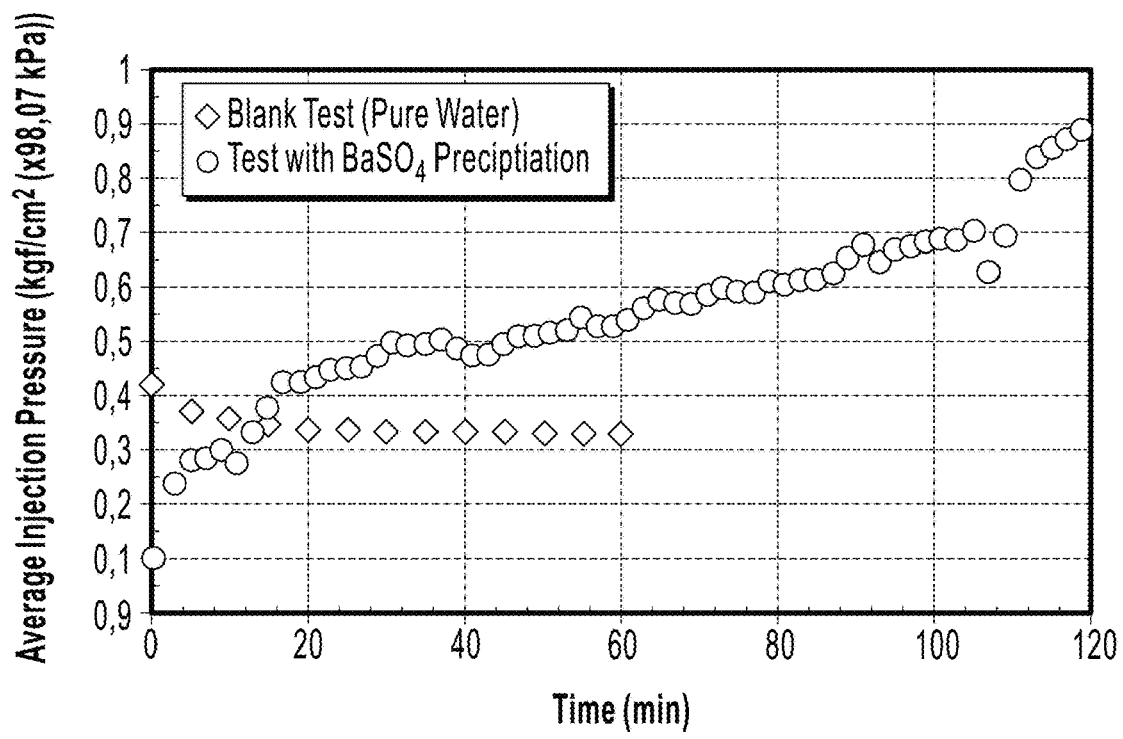
FIG. 9, which illustrates a graph of the pressure evolution in the core-holder of FIG. 8 as a function of $BaSO_4$ precipitation.

Through the formation of $BaSO_4$ crystals in the system, it was possible to evaluate the pressure growth over time, as shown qualitatively in FIG. 9.

Figure 10:
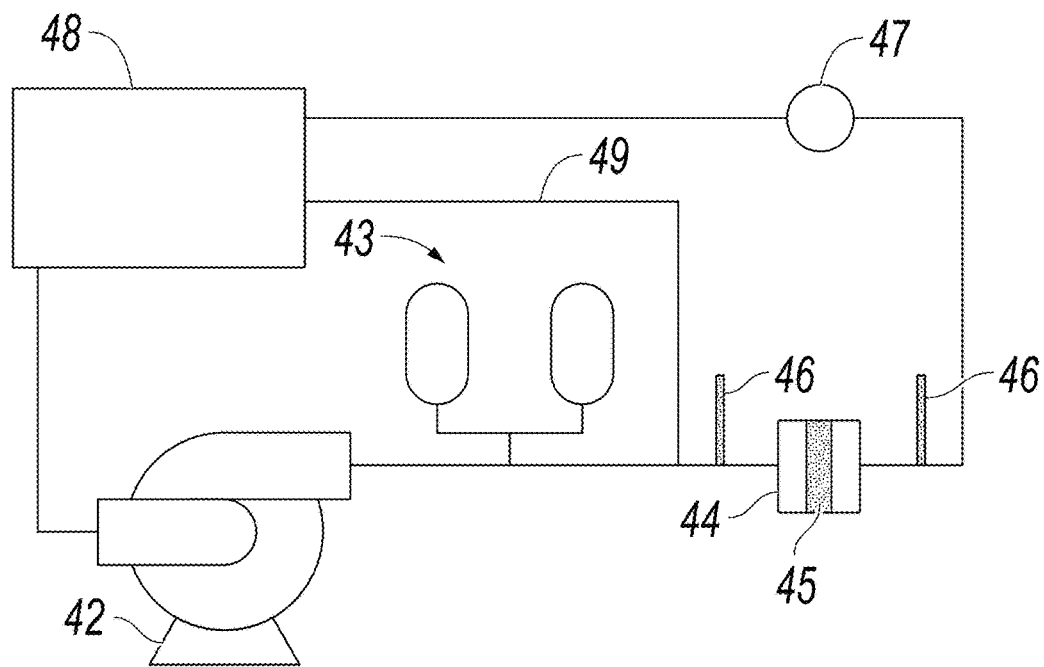
FIG. 10, which illustrates the experimental setup for study on a screen at low pressure and at room temperature. There are represented: positive displacement helical pump (42), pressure accumulators (43), mechanical coupling (screen holder) (44), screens (45), pressure transducers (46), flowmeter (47), reservoir of fluid (20 liters) (48), bypass (49)

In a similar way, to evaluate the fouling in screen coupons, experiments were carried out under laboratory conditions of pressure and temperature (FIG. 10).

Figure 11:
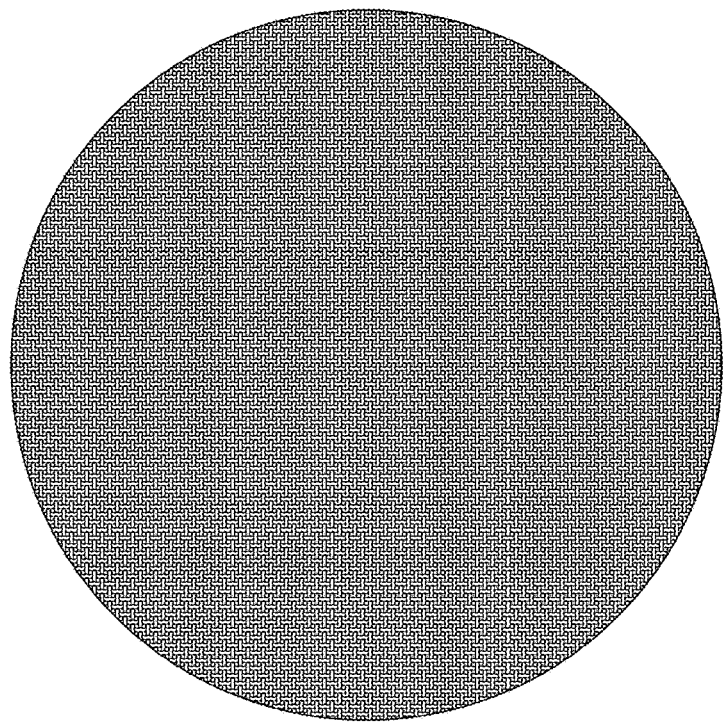
FIG. 11, which illustrates the carbonate fouling in a screen coupon for a test performed on the apparatus of FIG. 10.
Figure 12:
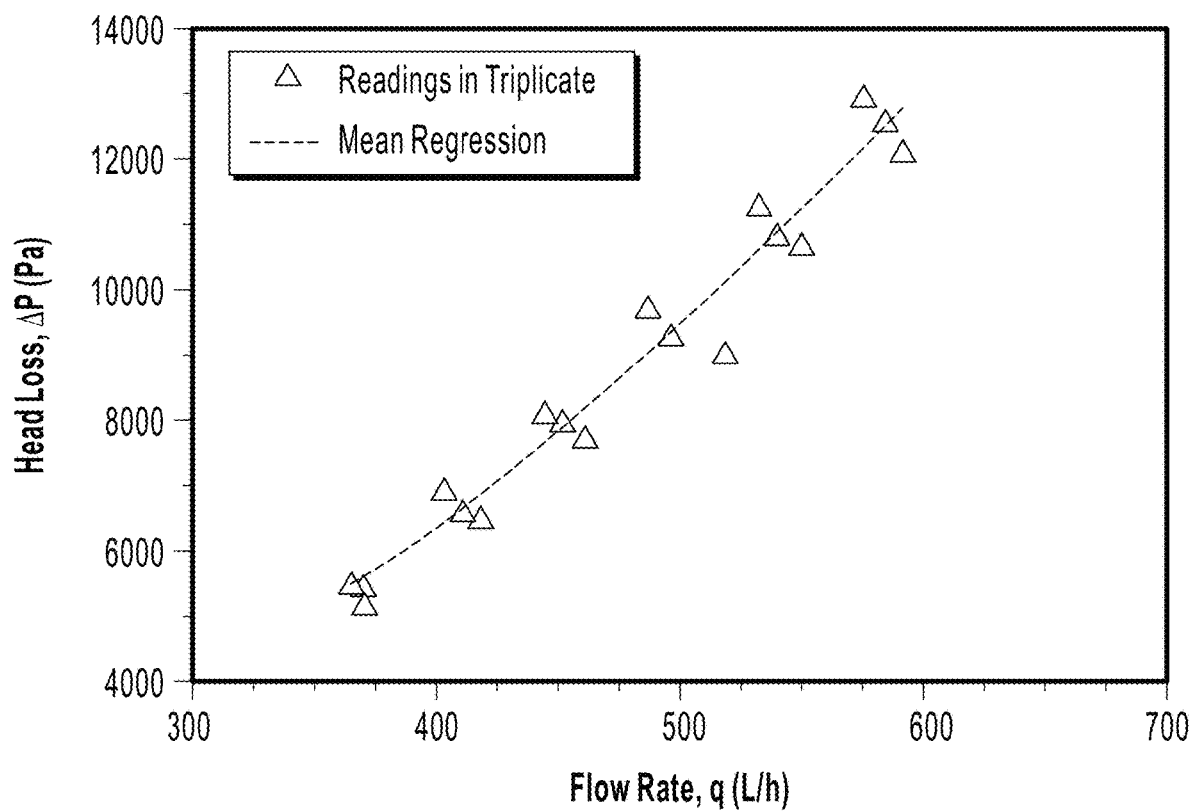
FIG. 12, which illustrates the pressure curve as a function of the restriction caused by the accumulation of $CaCO_3$ on the surface of the screen coupon for a test performed on the apparatus of FIG. 10.

The change in the pressure curve as a function of the restriction caused by the accumulation of $CaCO_3$ on the surface of the screen coupon (FIG. 11) can be seen in FIG. 12.

In the system of the present invention, an evaluation of the fouling potential in screen coupons is provided; however, in a lower flow rate condition, below the erosion velocity of the sand containment systems.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A system for evaluation of precipitation, adhesion, and inorganic scale, the system comprising:
 a reactor/pressurized cell coupled to a core-holder and a screened core-holder;
 an optical microscope;
 a cold water buffer tank;
 a heater;
 a cooler;
 a booster;
 safety valves;
 control valves;
 a control panel;
 a solids collection filter;
 an impeller with a coupon cage;
 a gas vent/relief system;
 a dynamic display;
 a pressurized pipette;
 a circulation pump;
 a gas flowmeter;
 a pneumatic lifter;
 a nitrogen pressurized buffer tank;
 various sensors;
 a sample collector;
 a hydrocyclone;
 an in-process reagent addition funnel;
 a safety vent/gas exhauster;
 a distilled water system; and
 a pH meter coupled to the reactor.

2. The system for evaluation of precipitation, adhesion, and inorganic scale according to claim 1, wherein the reactor/pressurized cell is configured to operate at pressures of up to 100 bar (10 MPa) and temperatures between 2° C. and 100° C.

3. The system for evaluation of precipitation, adhesion, and inorganic scale according to claim 1, wherein the core-holder allows investigating the phenomenon of inorganic precipitation in porous specimens, which aim at representing not only a gravel-pack-type sand containment system, but also a near-well condition.

4. The system for evaluation of precipitation, adhesion, and inorganic scale according to claim 1, wherein the screened core-holder is configured to support screen coupons that represent screen-type sand containment systems.

5. The system for evaluation of precipitation, adhesion, and inorganic scale according to claim 1, wherein the optical microscope is configured to image particles with an equivalent diameter of 2.0 micrometers, at a pressure of 100 bar (10 MPa) directly inside the reactor or the dynamic display, allowing an incorporation of features that capture particles with an equivalent diameter of 0.5 micrometers for lower pressures.

6. The system for evaluation of precipitation, adhesion, and inorganic scale according to claim 1, wherein the solids collection filter associated with the circulation pump is able to remove solid particles from the solution, allowing supersaturation tests to be performed.

7. The system for evaluation of precipitation, adhesion, and inorganic scale according to claim 1, wherein the coupon cage is configured to operate inside the reactor when the reactor is pressurized, the metallic coupon comprising:
 a magnetic coupling of the motor;
 an upper support;
 a set of eight coupons;
 a lower support; and
 an impeller type stirrer for bubbling $CO_2$.

8. The system for evaluation of precipitation, adhesion, and inorganic scale according to claim 7, wherein the coupon cage is configured to evaluate dynamic fouling in different materials, metallic or not, with different finishings and with different types of coating.

9. The system for evaluation of precipitation, adhesion, and inorganic scale according to claim 1, wherein the dynamic display is configured to display particles in flow, by displacing the microscope to its viewing windows.

10. The system for evaluation of precipitation, adhesion, and inorganic scale according to claim 9, wherein the dynamic display comprises on-off valves, being possible to store an aliquot of the contents of the reactor at a test pressure, detach the display from the reactor/pressurized cell, and transport the aliquot for analysis on other equipment outside the laboratory.

11. The system for evaluation of precipitation, adhesion, and inorganic scale according to claim 1, wherein the pressurized pipette is configured to inject reagents with the reactor already pressurized and heated.

* * * * *